INVENTOR.
Ernest J. Bonanno
BY
C. A. Gulbrandsen
Atty.

April 13, 1965 E. J. BONANNO 3,178,516

CALL FORWARDING ARRANGEMENT

Filed May 1, 1961 3 Sheets-Sheet 2

INVENTOR.
Ernest J. Bonanno

BY C. A. [signature]

Atty.

INVENTOR.
Ernest J. Bonanno
BY C. A. Hulbrandsen
Atty.

United States Patent Office 3,178,516

Patented Apr. 13, 1965

3,178,516

CALL FORWARDING ARRANGEMENT

Ernest J. Bonanno, Roselle, Ill., assignor to Automatic Electric Laboratories, Inc., Northlake, Ill., a corporation of Delaware Filed May 1, 1961, Ser. No. 106,664
7 Claims. (Cl. 179—18)

This invention relates to a call forwarding arrangement.

In a telephone exchange arranged for call forwarding, subscriber lines provided with this service have individual apparatus including a register which is directively set to forward calls to any one of a number of stations. In some prior arrangements, the register embodied in the call forwarding apparatus can only be set from the particular line which the apparatus is arranged to serve. With such an arrangement, it is necessary for the subscriber to return to the location of his own station apparatus every time he wishes to change the setting of his call forwarding register. In other prior call forwarding arrangements the register may be set from any line of the system merely by dialing the access code assigned to the particular subscriber. This arrangement is undesirable since it permits anyone who happens to know a subscriber's access code to control the setting of the register.

The object of this invention is to provide an arrangement which prevents unauthorized setting of the register in the call forwarding apparatus, while providing convenient access for setting of the register by the subscriber served.

According to the invention, the call forwarding apparatus of an individual subscriber may be reached by dialing an individually assigned special access number, and if the connection has been made either from the individual subscriber's line or from a line to which the register has been set, the register may be controlled to set it to any desired position. If the connection is from any other line, the testing arrangement is effective to block control of the register. Thus the subscriber provided with call forwarding service may at any time control his individual call forwarding register from his home station, and also if he has set his register to forward calls to another station he may control the register from that station.

Figure 1:
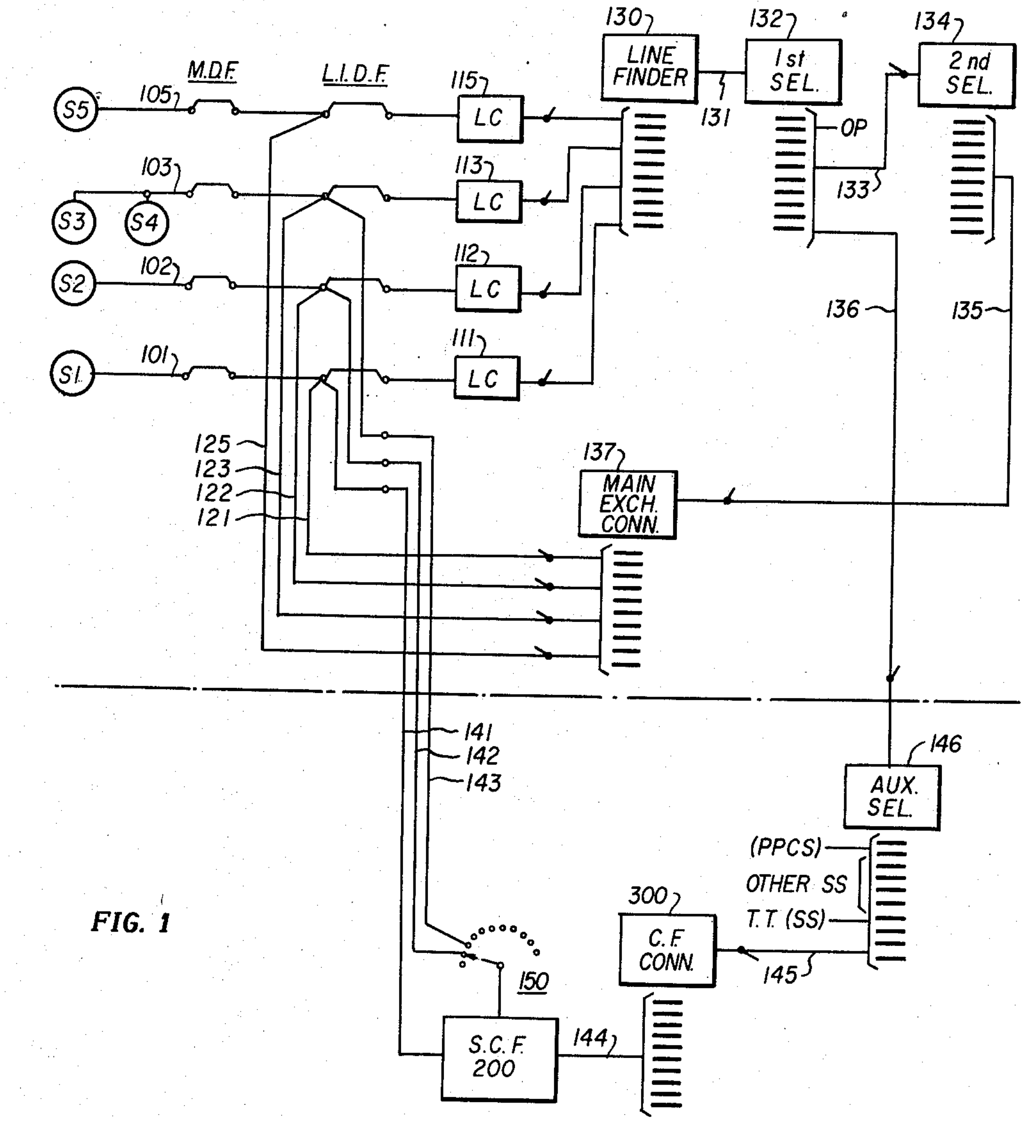
Figure 2:
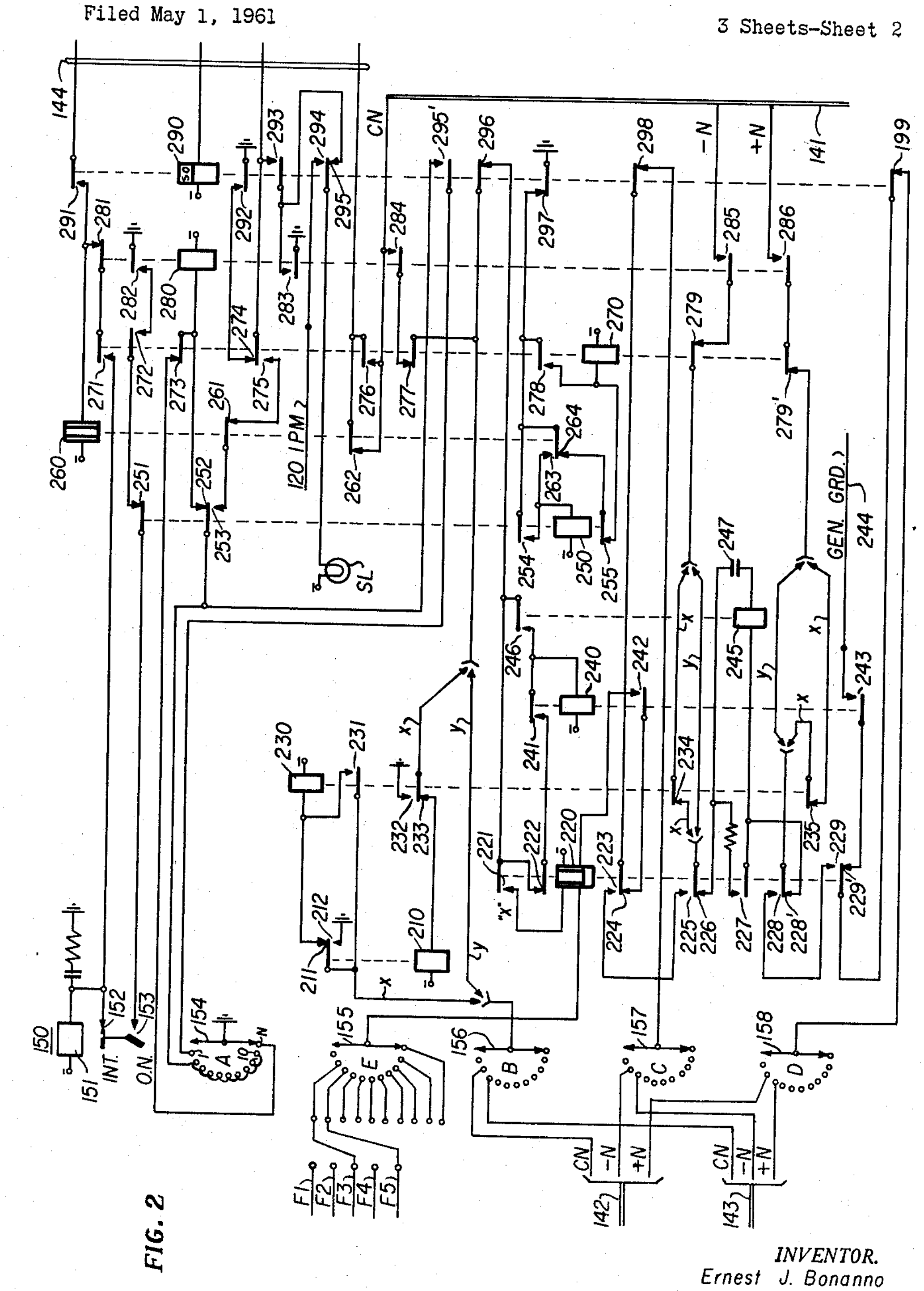
Figure 3:
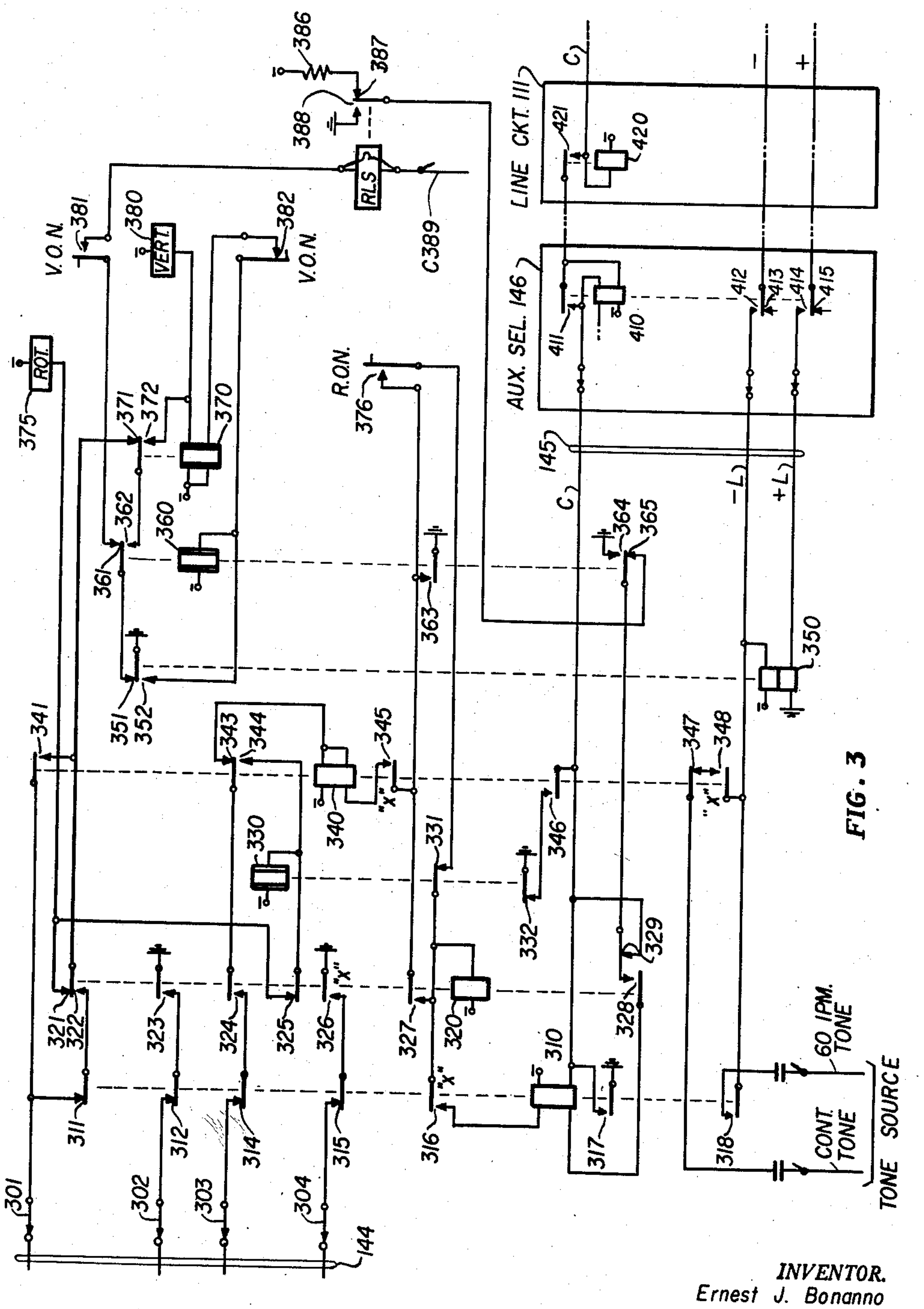

The above-mentioned and other objects and features of this invention and the manner of obtaining them will become more apparent and the invention itself will be best understood, by reference to the following description of an embodiment of the invention taken in conjunction with the accompanying drawings comprising FIGS. 1 to 3, wherein:

FIG. 1 is a block diagram of an automatic telephone exchange including call forwarding apparatus according to the invention; and FIGS. 2 and 3, with FIG. 3 placed to the right of FIG. 2, comprise a schematic diagram of the call forwarding apparatus shown in FIG. 1.

Referring to FIG. 1, the upper portion of the drawing shows a conventional automatic telephone exchange, which may be either a main exchange or a private exchange. The exchange may encompass several hundred lines divided into the usual decimal groups of 100 lines each. The drawing shows some of the lines of one such 100-line group. Lines 101, 102, and 105 serve stations S1, S2, and S5 respectively and are equipped with line circuits 111, 112 and 115 respectively. Line 103 is shown as a party line serving stations S3 and S4, and is equipped with line circuit 113. Each of the lines is shown connected through a jumper of the main distributing frame MDF and a jumper of the line intermediate distributing frame LIDF to its individual line circuit. This group of lines is accessible to a plurality of line finders including finder 130 in multiple, and to a plurality of connectors including connector 137 in multiple. The line finders are linked to respective first selectors, line finder 130 being linked to the first selector 132. The several first selectors have their bank contacts connected in multiple level-by-level in the usual manner, giving them access to the several levels of trunks, usually ten. As many of these levels of trunks as needed are used for access to respective groups of second selectors such as second selector 134. One level is used for access to operator trunks, and one level is used for access over trunks such as 136 to auxiliary selectors such as selector 146 to provide special services.

The second selectors may have their bank contacts connected in multiple level-by-level in the same manner as the first selectors. The trunks from the second selectors may be used for access to respective groups of connectors, for example as shown in the drawings, trunk 135 provides access to the connector 137. Interoffice trunks to and from other exchanges may also be provided. For simplicity these interoffice trunks have not been shown on the drawing.

The trunks from respective levels of the auxiliary selector 146 are used to provide special service features such as toll ticketing, person to person collect service (PPCS), etc. One level is used for access over trunks such as trunk 145 to the call forwarding apparatus.

Each line which is equipped for call forwarding service is provided with an individual register 150 and subscriber call forwarding equipment 200. To control the setting of the register 150, access to the control equipment 200 is provided by a call forwarding connector 300 which is reached over trunk 145. This connector 300 may be provided in common to serve as many as 100 individual subscriber call forwarding equipment units 200.

To provide a subscriber station such as station S1 on line 101 with call forwarding service, a jumper is connected from his connector terminals on the line intermediate distributing frame LIDF to trunk 141 to the unit 200. For each station of the exchange to which this subscriber may wish to have calls forwarded, a three-conductor jumper connection is made from the line intermediate distributing frame LIDF conductor terminals of the line serving that station to a trunk to a set of bank contacts of the register 150. The drawing shows two such connections one from one set of bank contacts of the register 150 via a trunk 142 and a jumper to the connector terminals of line 102 to provide for forwarding calls to station S2, and the other from another set of bank contacts of register 150 via trunk 143 and a jumper to the connector terminals of line 103 to provide for forwarding calls to station S3 on that line. The number of stations to which calls may be forwarded is determined by the number of bank contact positions on the register switch 150. The drawing shows switch 150 as having 10 positions, but it could be a switch having 25 or more positions.

If it is desired to make a call from any station, for example station S1 on line L1, the usual line signal causes line circuit 111 to respond. An idle line finder, such as line finder 130 is thereby caused to connect its associated selector 132 to the calling line 101.

If it is desired to call another station of the system, the proper number may now be dialed. The first digit causes the selector 132 to step to the corresponding level and to select an idle trunk such as trunk 133 to an idle second selector such as 134. The dialing of the second digit steps selector 134 to the corresponding level, and it thereupon selects an idle trunk such as 135 to an idle connector such as connector 137. The subsequent dialing of the tens and units digit in the number of the desired line, steps the connector 137 to the corresponding level and to the contact set of the called line. The called station on that line is then signaled in the usual manner until the call is answered, the connection being released when the handsets (now shown) are replaced.

Assume now that the subscriber at station S1 is about to leave for a location of one of the other stations having a jumper connection to switch 150. After a line finder 130 and a first selector 132 is seized, the individual call forwarding access code is dialed. The first digit steps the selector 132 to the special service level and causes it to seize a trunk such as 136 to the auxiliary selector 146. The second digit steps the auxiliary selector 146 to the call transfer level and causes it to seize an idle trunk such as 145 to the call forwarding connector 300. The next two digits then step the connector 300 to the corresponding level and to the contact set of trunk 144 of the subscriber's individual call forwarding unit 200.

According to the invention, the connector circuit 300 now makes a test to determine whether or not the call is from an authorized line. A test signal is applied to one of the conductors of trunk 141, and this signal is also applied to one of the conductors extending to a wiper of the switch 150. If the switch 150 has previously been set for call transfer service to one of the stations such as station S2, the test signal is extended through a conductor of the corresponding trunk 142. If the call is from an authorized line, this signal is then extended through the switch train including in this case the line circuit 111 or 112, the line finder 130, the first selector 132, the auxiliary selector 146 and back over trunk 145 to the connector 300. The connector then switches through. On seizure of the call transfer unit 200, the register 150 is returned to its home position. The calling subscriber may then either disconnect so that incoming calls will not be forwarded, or he may dial the code number of the station to which he wishes to have calls transferred, thereby stepping the register switch 150 in accordance with this selection.

If the call has originated from an unauthorized station, that is a station on any line other than the line 101 individually associated with the equipment unit 200, and the line such as line 102 to which switch 150 has been set, the test signal is not returned over trunk 145, and therefore the connector 300 does not seize the unit 200. Instead busy tone is returned over trunk 145 and the connection to the calling subscriber.

Assume now that the register 150 has been set to forward calls over trunk 142 to station S2 on line 102, and that station S5 on line 105 initiates a call intended for the subscriber at station S1 on line 101. After completion of dialing, the connection extends from line 105 through line circuit 115 over a path in the regular switch train, which in this case may be line finder 130, first selector 132, second selector 134, and connector 137, to the connector multiple 121 extending to the line 101. The regular ringing signal for station S1 is applied from the connector 137 to cause operation of the ringer at station 101 in the usual manner. The connection is also extended from line multiple 121 to the jumper of the line intermediate distributing frame LIDF over trunk 141 to the subscriber call forwarding unit 200. The connection is automatically extended through the unit 200 and the register switch 150 to trunk 142 extending to line 102. The unit 200 then causes the ringing signal for station S2, to operate the ringer at that station. The ringing signal supplied to station S2 does not have to be the same signal as is applied to station S1. For example these may be two different ringing frequencies. The call may now be answered either at the transferred to station S2 or at the main station S1.

FIGS. 2 and 3, with FIG. 3 placed to the right of FIG. 2 comprise a detailed schematic drawing of the call forwarding apparatus. FIG. 2 shows the register switch 150 and the control equipment 200 individual to the subscriber line provided with call forwarding service. FIG. 3 shows the connector 300, and also a portion of the auxiliary selector 146 and the line circuit 111.

Assume now that the subscriber at station 1 on line 101, desiring to set his register 150 to forward calls to one of the other stations such as station S2 on line 102, has initiated a call and commenced dialing of his special access number, as described with respect to FIG. 1. After the auxiliary selector 146 has been seized, a digit is received which steps it to the call transfer level. Connector 300, being idle as indicated by battery potential applied through a 500-ohm resistor 386 and contacts 387, 365, and 329 to the C lead, is seized by the selector 146. The closed loop at the —L and +L conductors operates relay 350, which at its contacts 352 supplies ground to operate the hold relay 360. Ground potential is applied to the C lead through contacts 364 and 329. Relay 370 operates over a path through its lower winding, the vertical off normal contacts 382, and ground at contacts 352. A pulsing path for the vertical magnet 380 is prepared through contacts 372, and 362 to the pulsing contacts of relay 350. The next digit dialed causes vertical stepping as in an ordinary connector. At the end of the digit relay 370 releases and at its contacts 371 transfers the pulsing circuit to the rotary magnet 375 and prepares a path for relay 330. Dialing of the next digit steps the connector in the rotary direction over the path from the pulsing contacts through contacts 362, 371 and 321. Relay 330 operates over the same path extending through contacts 325 to the winding. At the end of the digit removal of ground at contacts 351 causes relay 330 to release. Relay 320 then operates over a path through contacts 331, rotary-off-normal contacts 376, and contacts 363 to ground. Operation of relay 320 cuts through a connection over trunk 144 to the subscriber's call forwarding unit 200. The holding path for relay 320 is completed through its own contacts 327 and contacts 363 to ground.

The connector makes a test for the authority of seizure by placing ground from its "X" contacts 326, through contacts 315 and wiper 304 to the C lead of trunk 144. This ground is extended to the CN lead of trunk 141, and thence as shown in FIG. 1, over the jumper connections on the line intermediate distributing frame LIDF to line circuit 111, and thence over the established connection through contacts 421 of the line circuit, the intermediate switching stages, contacts 411 of selector 146, to the C lead of trunk 145 to one side of the lower winding of relay 310. At the same time the operation of relay 320 causes ground to be extended from contacts 364, through contacts 328 to the left hand side of the lower winding of relay 310. Therefore this winding is effectively shunted and the relay does not operate. This permits the calling party to complete the setting up of the call forwarding register 150.

If the register switch 150 is already set to forward calls to one of the stations, for example if it is operated to extend connections over trunk 142 to station S2 on line 102, a call from that station S2 would also be authorized. Assume that the "Y" wiring is used in FIG. 2. With the switch 150 in one of the set positions, relay 280 is in its operated position because of ground supplied to its winding from wiper 154, through contacts 252. Therefore the ground on the C lead of trunk 144 is extended through contacts 262, 284, and 277 to the wiper 156 and thence over the CN lead of the trunk 142, and as shown in FIG. 1 over the jumper connection on the distributing frame LIDF to the line circuit 112. If the call has originated from the corresponding line 102, this ground is extended through the established connection in the same manner as for a call which originated from station S1 so that in FIG. 3 relay 310 does not operate.

However if the call has originated from any other line it is an unauthorized call. There is no ground connection applied to the C lead of the established connection from the distributing frame LIDF. Therefore battery potential from relays such as the cut off relay 420 in the line circuit, and the relay 410 in the selector is extended over the C lead of trunk 145 and to the lower winding of relay 310, thence through contacts 328 and 364 to ground. Therefore relay 310 operates and at its contacts opens the connection to trunk 144. Therefore the calling party has no control of the register switch 150. A busy tone signal at 60 I.P.M. is applied through contacts 318, and over the connection through the switch train to the calling station.

Returning now to description of the operation for a call from an authorized line, with relay 320 operated and relay 310 in the released condition, the subscriber's call forwarding unit 200 has been seized. Relay 290 operates from ground supplied through contacts 323 and 312 and wiper 302. Relay 270 operates from ground applied through contacts 297, 264, and 255; and locks at its own contacts 278.

The register switch 150 is either in position 1, indicating no pre-setting; or it is in one of the other positions to forward calls to the corresponding line.

If it is in one of the latter positions, relay 280 will be in the operate condition because of ground supplied through contact 252 and wiper 154 in one of the positions 2 through 10 or if the wiper 154 is in position N, ground is supplied through the wiper 154 and contact 273.

If the register switch is in position 1 when seized, relay 280 will be operated by ground supplied through contacts 252, 295' and wiper 154. Also, it is seen that off normal contact 153 will be closed when register switch 150 is in any position except the position N and that when this contact is closed and relay 280 is operated ground is supplied to coil 151 through interrupter contact 152, off normal contact 153, and contacts 251, 272 and 282. This arrangement will cause switch 150 to step until it reaches the position N at which point contact 153 opens breaking the ground path to coil 151.

So no matter what position register switch 150 is in prior to seizure it will remain in or step to position N upon being seized. Also, upon being seized and while the register switch 150 is stepping to position N and relay 280 is operated, relay 340 is operated through its upper winding by ground supplied through contacts 343, 324, 314, 303, 293 and 283 closing only its "X" contacts. Thus a source of steady tone is connected to the subscriber's line through contact 347, "X" contact 348, and contact 412.

When the register switch 150 steps to position N, relay 280 releases because contact 273 is open and there is no ground path. Ground is removed from the TC lead, permitting current to flow in the lower winding of relay 340 in series with its upper winding causing it to operate completely. At contact 347 the steady tone is removed from the line so the subscriber knows it is time to dial the remaining digit if the unit is to be set to forward calls.

If the transfer unit merely is being cleared and no further setting is desired the subscriber releases by replacing the handset. This operation releases relay 350 and then relay 360 supplying a last pulse and stepping the register switch to position 1 before relays 290 and 270 release. The forwarding unit is now available for setting at some future time from the subscriber's own phone.

Now, suppose that the unit is not merely being cleared but the subscriber wishes to forward his calls to another phone represented by one of the positions 2 to N on the register switch. In this case, another digit is dialed into the system when the steady tone stops indicating that the register switch is in position N.

The dial pulses of this last digit are transferred to register switch 150 over a path from ground through contacts 351, 362, 271, 341, wiper 301, contacts 291, 281 and contact 271. These pulses step the register switch 150 to a position one step away from the desired position and at the end of this digit, relay 260 releases thus applying a ground pulse to relay 330 by a path from ground through wiper 154 and a contact 2 through N, contacts 253, 261, 275, lead TC, wiper 303, contacts 314, 324, and contact 344. When relay 330 operates it removes a shunting ground through contact 332 for relay 310 which now operates thus applying busy tone to the subscriber. When the subscriber hears this busy tone he replaces the handset and one more pulse is applied to register switch 150 over the same path stated above before relays 290 and 270 release and the register switch steps to the desired position.

When the subscriber releases by replacing the handset the connector 300 is free for other use and the call forwarding equipment is ready to operate. At this time relay 280 is held in operated condition by a ground from wiper 154 through a contact 2 through N and contact 252 so that contacts 284, 285 and 286 are closed connecting the subscriber's line to the call forwarding equipment.

When a call is made to the main line, relay 245 operates since it is connected across —N and +N of line 141 by a path from +N through contacts 286, 279' and 288', and from —N through contacts 285, 279, and 236. Operation of relay 245 provides a ground for relay 240 through contacts 246, 296, 277 and 284 to CN lead of line 141.

Operation of relay 240 puts generator ground on wiper 158 through contacts 299, 299' and 243, and applies a ringing signal of the correct frequency to the wiper 157 from a signal source at wiper 155 through relay 220 and contacts 242, 224 and 298.

When the telephone transferred to is answered the loop is closed between wiper 157 and 158 so that relay 220 operates to first close the "X" contact 221. This locks up relay 220 and releases relay 240 by opening contact 222 and thus the ringing stops.

This operation also closes the transmission path from —N to +N of line 141 through wipers 157 and 158 of register switch 150 to —N and +N of the line to which the call is being transferred.

When the call is completed and the calling party replaces his handset there is no longer a ground on lead CN of line 141 to hold up relay 220 and so it releases leaving the call forwarding equipment 200 ready to forward another call.

An option is provided by "X" wiring and relays 210 and 230, to split the "C" lead of the main station and associated station for detection purposes when operating with toll ticketing equipment.

While I have described above the principles of my invention in connection with specific apparatus, it is to be clearly understood that this description is made only by way of example and not as a limitation to the scope of my invention.

What is claimed is:

1. In an automatic telephone exchange having a plurality of subscribers' lines having stations thereon, automatic switching apparatus for setting up connections between said lines, call forwarding apparatus including a register individually and directly connected to one of said lines arranged so that when the register is set and said one line is idle calls directed to said one line are forwarded to the station designated by the setting of the register, means for setting the register including auxiliary switching apparatus for establishing a connection from a calling one of said lines to said call forwarding apparatus and for associating the connection with said register, testing means which in response to the calling line being either said one line individual to the register or a line to which the register has been set for indicating an authorized connection and for permitting the register to be selectively controlled and set in response to signals from the calling line; said testing means being operative in response to the connection being from any other line for indicating an unauthorized connection and for preventing control of the register; whereby a register can be set to another one of said number of the other lines or one line individual to the register in accordance with said signals.

2. In an automatic telephone exchange, the combination as claimed in claim 1 wherein said testing means comprises a relay with a winding connected to the control lead of any auxiliary selector, means for applying ground potential to one winding of said testing relay and a source of potential to the other winding of said testing relay if said calling line is an unauthorized subscriber of said call forwarding apparatus, the last said means being responsive to the completion of the dialing of the last digit of an access code, and means for applying ground to both sides of said winding of said testing relay if said calling line is an authorized subscriber of said call forwarding apparatus.

3. In a automatic telephone exchange, the combination as claimed in claim 1, wherein means are provided for tones to be sent out to said calling subscriber after said subscriber has dialed said access code in order to place said assigned call forwarding apparatus into use, and means are provided for a busy tone to be sent out to said calling subscriber after said call forwarding arrangements have been effected indicating to said calling subscriber that all incoming calls to said subscriber's main substation will be forwarded to said pre-selected substation now arranged to accept said subscriber's forwarded calls.

4. In an automatic telephone exchange, the combination as claimed in claim 1, wherein said register individual to one of said lines is so arranged that it is automatically restored to a normal condition upon said connection being established and associated with said register.

5. In an automatic telephone exchange, the combination as claimed in claim 1, wherein said register individual to one of said lines is a stepping switch.

6. In an automatic telephone exchange, the combination as claimed in claim 1, wherein a plurality of different ringing signals are provided for selective signaling, means for applying a predetermined one of the ringing signals to the line to which calls are being forwarded independently of which one of said ringing signals is used on the line from which calls are being forwarded.

7. In an automatic telephone exchange having a plurality of subscribers' lines extending thereto, automatic switching apparatus for setting up connections between said lines, call forwarding apparatus including a register individual to one of said lines for extending connections from said one line to any selected one of a number of the other lines, means including auxiliary switching apparatus for establishing a conection from a calling one of said lines to said call forwarding apparatus and for associating the connection with said register, testing means which in response to the calling line being said one line individual to the register for indicating an authorized connection and for permitting the register to be selectively controlled and set in response to the signals from the calling line, wherein a plurality of different ringing signals are provided for selective signalling, means for applying a predetermined one of the ringing signals to the line to which calls are being forwarded independently of which one of said ringing signals is used on the line from which calls are being forwarded.

References Cited by the Examiner

UNITED STATES PATENTS

| | | | |
|---|---|---|---|
| 2,909,607 | 10/59 | Nilsson et al. | 179—18 X |
| 2,957,047 | 10/60 | Wennemer | 179—18 |
| 3,033,938 | 5/62 | Young | 179—27 |
| 3,041,406 | 6/62 | Killian | 179—18 |

ROBERT H. ROSE, *Primary Examiner.*

WALTER L. LYNDE, *Examiner.*